United States Patent
Isshiki et al.

(10) Patent No.: US 12,151,529 B2
(45) Date of Patent: Nov. 26, 2024

(54) SUSPENSION CONTROL DEVICE AND SUSPENSION DEVICE

(71) Applicant: Hitachi Astemo, Ltd., Hitachinaka (JP)

(72) Inventors: Ken Isshiki, Hitachinaka (JP); Kyoichi Tagami, Hitachinaka (JP); Noal Van Nguyen, Hitachinaka (JP); Eishi Ishimaru, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 236 days.

(21) Appl. No.: 17/838,409

(22) Filed: Jun. 13, 2022

(65) Prior Publication Data
US 2022/0324281 A1    Oct. 13, 2022

Related U.S. Application Data

(63) Continuation of application No. PCT/JP2020/001037, filed on Jan. 15, 2020.

(30) Foreign Application Priority Data

Jan. 9, 2020   (JP) .................. 2020-002135

(51) Int. Cl.
*B60G 17/016*   (2006.01)
*B60G 17/08*    (2006.01)

(52) U.S. Cl.
CPC .......... *B60G 17/0162* (2013.01); *B60G 17/08* (2013.01); *B60G 2400/0511* (2013.01);
(Continued)

(58) Field of Classification Search
CPC ........... B60G 17/015; B60G 17/0152; B60G 17/016; B60G 17/0162; B60G 17/0164;
(Continued)

(56) References Cited

U.S. PATENT DOCUMENTS

| 2004/0024504 A1* | 2/2004 | Salib ............... B62D 7/159 701/38 |
| 2007/0156314 A1* | 7/2007 | Tomida ........... B60G 17/0152 701/37 |

(Continued)

FOREIGN PATENT DOCUMENTS

| JP | 2006327312 A | 12/2006 |
| JP | 2007170590 A | 7/2007 |

(Continued)

OTHER PUBLICATIONS

International Search Report mailed Apr. 7, 2020 for the corresponding International Patent Application No. PCT/JP2020/001037, 5 pages including English translation.

(Continued)

*Primary Examiner* — Erick R Solis
(74) *Attorney, Agent, or Firm* — Leason Ellis LLP; Edward J. Ellis; Melvin C. Garner

(57) ABSTRACT

The present invention achieves suspension control that allows for synchronization of the roll and the pitch of a vehicle. This suspension control device that controls the damping force of a suspension comprises: a target pitch angle calculation unit that calculates a target pitch angle with reference to a roll angle signal; and a target control amount computation unit that calculates the roll posture target control amount referred to for controlling the damping force of the suspension by referring to a steering torque signal and the target pitch angle.

7 Claims, 7 Drawing Sheets

(52) U.S. Cl.
CPC .. *B60G 2400/0512* (2013.01); *B60G 2400/42* (2013.01); *B60G 2500/10* (2013.01)

(58) Field of Classification Search
CPC ........ B60G 17/01908; B60G 17/01916; B60G 17/01925; B60G 17/08; B60G 2400/0511; B60G 2400/0512; B60G 2400/0521; B60G 2400/0522; B60G 2400/252; B60G 2500/104
USPC ...................................................... 701/37, 38
See application file for complete search history.

(56) References Cited

U.S. PATENT DOCUMENTS

| | | | | |
|---|---|---|---|---|
| 2008/0290618 | A1* | 11/2008 | Yanaka | B60G 17/0195 280/6.15 |
| 2009/0234537 | A1* | 9/2009 | Tomida | B60G 17/08 701/38 |
| 2010/0076649 | A1* | 3/2010 | Iyoda | B60G 17/08 701/38 |
| 2010/0191420 | A1* | 7/2010 | Honma | B60G 17/0162 701/38 |
| 2019/0359023 | A1* | 11/2019 | Isshiki | B60G 17/018 |

FOREIGN PATENT DOCUMENTS

| | | |
|---|---|---|
| JP | 2014141123 A | 8/2014 |
| JP | 2015047907 A | 3/2015 |
| JP | 2018161952 A | 10/2018 |

OTHER PUBLICATIONS

Written Opinion mailed Apr. 7, 2020 for the corresponding International Patent Application No. PCT/JP2020/001037, 4 pages.

* cited by examiner

SUSPENSION CONTROL DEVICE AND SUSPENSION DEVICE

CROSS REFERENCE TO RELATED APPLICATIONS

This application is a Continuation of International Patent Application No. PCT/JP2020/001037 filed on Jan. 15, 2020, and claims the benefit of priority to Japanese Patent Application No. 2020-002135 filed on Jan. 9, 2020, the contents of all of which are incorporated herein by reference in their entireties.

FIELD OF THE INVENTION

The present invention relates to a suspension control device and a suspension device.

BACKGROUND OF THE INVENTION

In controlling a traveling state of a vehicle, from a viewpoint of enhancing safety in traveling of the vehicle, a control for synchronizing roll and pitch as a vehicle motion by using technique of controlling a brake or a suspension is disclosed (see, for example, US 2004/0024504 A).
Patent Literature 1: US 2004/0024504 A However, the above-described patent literature does not disclose a specific control method for the control for synchronizing the roll and the pitch.

An aspect of the present invention is to realize control of a suspension capable of synchronizing roll and pitch of a vehicle.

SUMMARY OF THE INVENTION

To solve the problem described above, a suspension control device according to an aspect of the present invention which controls a damping force of a suspension, includes a target pitch angle calculation portion which calculates a target pitch angle with reference to a roll angle signal, and a target control amount calculation portion which calculates a target control amount with reference to a steering torque signal and the target pitch angle, the target control amount being referred to when controlling the damping force of the suspension.

To solve the problem described above, a suspension device according to another aspect of the present invention includes a suspension and a control portion which controls a damping force of the suspension, where the control portion includes a target pitch angle calculation portion which calculates a target pitch angle with reference to a roll angle signal, and a target control amount calculation portion which calculates a target control amount with reference to a steering torque signal and the target pitch angle, the target control amount being referred to when controlling the damping force of the suspension.

According to the aspects of the present invention, it is possible to synchronize roll and pitch of a vehicle by controlling a suspension.

DETAILED DESCRIPTION OF THE INVENTION

The inventors of the present invention have diligently studied a control of a suspension, which allows roll and pitch of a vehicle to be synchronized. As a result, it is found that by controlling the suspension so as to be able to synchronize the roll and pitch of the vehicle, it is possible to enhance a sense of unity with the vehicle that a driver of the vehicle feels.

First Embodiment

Hereinafter, an embodiment of the present invention will be described in detail. First, a vehicle in which a suspension device and a suspension control device according to the embodiment of the present invention are adopted will be described. In this specification, the expression "with reference to" may include meanings such as "using", "considering", and "depending on". Further, specific examples of a "control amount" in this specification include a current value, a duty ratio, a damping factor, a damping ratio, and the like.

[Configuration of Vehicle]

Figure 1:
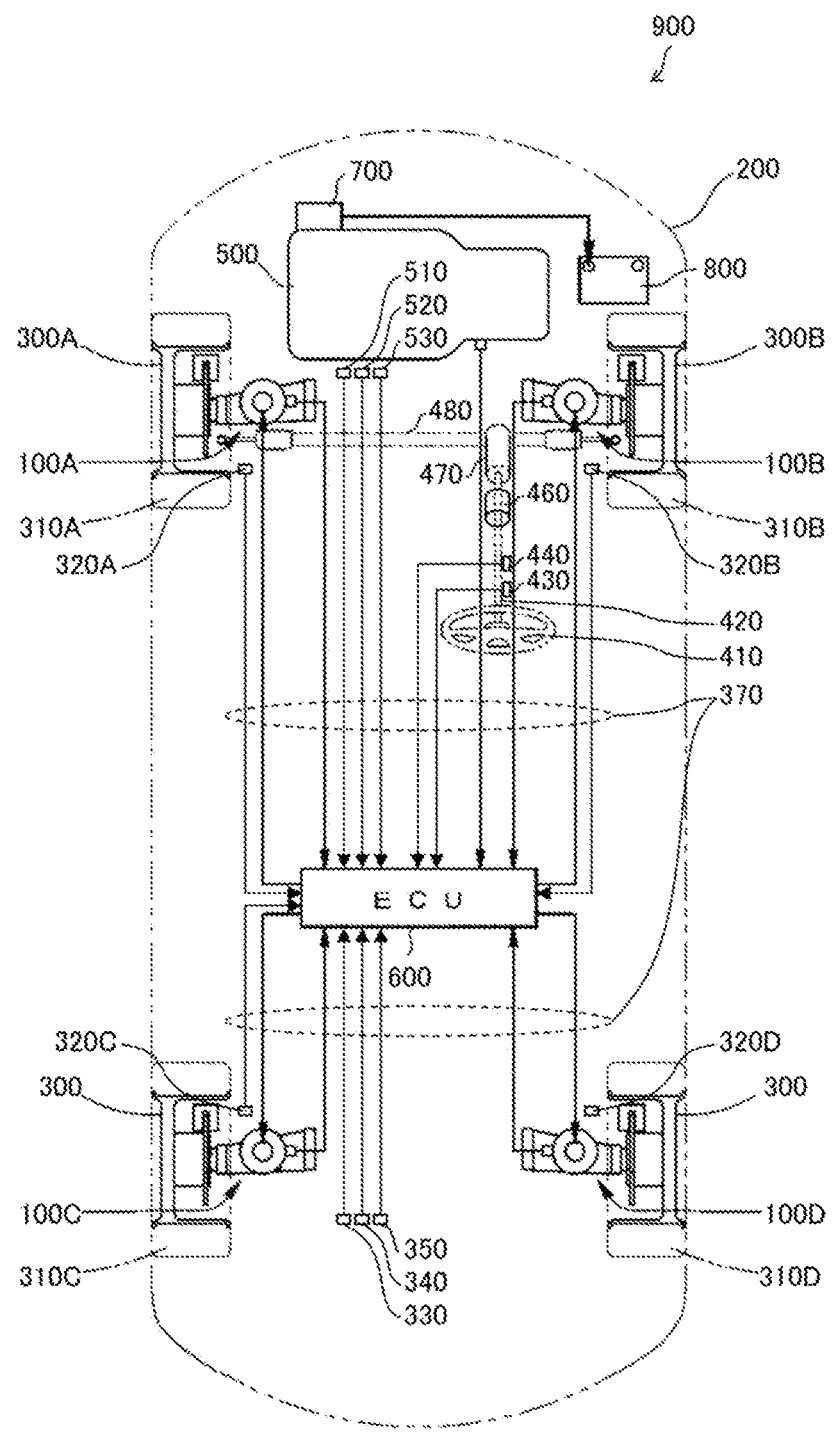
FIG. 1 is a diagram schematically illustrating an example of a configuration of a vehicle according to a first embodiment of the present invention.

FIG. 1 is a diagram schematically illustrating an example of a configuration of a vehicle 900 according to the present embodiment. As illustrated in FIG. 1, the vehicle 900 includes a suspension apparatus (suspension) 100, a vehicle body 200, a vehicle wheel 300, a tire 310, a steering member 410, a steering shaft 420, a torque sensor 430, a steering angle sensor 440, a torque application portion 460, a rack and pinion mechanism 470, a rack shaft 480, an engine 500, an electronic control unit (ECU) (control device, control portion) 600, an electric power generation device 700, and a battery 800. Here, the suspension apparatus 100 and the ECU 600 configure a suspension device according to the present embodiment.

The vehicle wheel 300 on which the tire 310 is mounted is suspended from the vehicle body 200 by the suspension apparatus 100. Since the vehicle 900 is a four-wheeled vehicle, the suspension apparatus 100, the vehicle wheel 300, and the tire 310 are provided on each of the four wheels.

The tires and vehicle wheels of a left front wheel, a right front wheel, a left rear wheel, and a right rear wheel are also referred to as a tire 310A and a vehicle wheel 300A, a tire 310B and a vehicle wheel 300B, a tire 310C and a vehicle wheel 300C, and a tire 310D and a vehicle wheel 300D, respectively. Hereinafter, similarly, configurations attached to the left front wheel, the right front wheel, the left rear wheel, and the right rear wheel may be represented by adding the reference letters "A", "B", "C", and "D".

The suspension apparatus 100 includes a hydraulic shock absorber (absorber), an upper arm, and a lower arm. Further, as an example, the hydraulic shock absorber includes a solenoid valve which is an electromagnetic valve for adjusting a damping force generated by the hydraulic shock absorber. However, the present embodiment is not limited to this, and the hydraulic shock absorber may use an electromagnetic valve other than the solenoid valve as the electromagnetic valve for adjusting the damping force. For example, the hydraulic shock absorber may adopt a configuration in which an electromagnetic valve using an electromagnetic fluid (magnetic fluid) is provided as the electromagnetic valve described above.

The electric power generation device 700 is attached to the engine 500, and the electric power generated by the electric power generation device 700 is stored in the battery 800.

The steering member 410 operated by a driver is connected to one end of the steering shaft 420 so as to be able to transmit torque, and the other end of the steering shaft 420 is connected to the rack and pinion mechanism 470.

The rack and pinion mechanism 470 is a mechanism for converting a rotation of the steering shaft 420 around an axis into a displacement along an axial direction of the rack shaft 480. When the rack shaft 480 is displaced in the axial direction, the vehicle wheel 300A and the vehicle wheel 300B are steered via a tie rod and a knuckle arm.

The torque sensor 430 detects a steering torque applied to the steering shaft 420, in other words, a steering torque applied to the steering member 410, and provides the ECU 600 with a torque sensor signal indicating a detection result. More specifically, the torque sensor 430 detects a twist of a torsion bar built in the steering shaft 420 and outputs a detection result as the torque sensor signal. As the torque sensor 430, a well-known sensor such as a Hall IC, an MR element, or a magnetostrictive torque sensor may be used.

The steering angle sensor 440 detects a steering angle of the steering member 410 and provides a detection result to the ECU 600.

The torque application portion 460 applies an assist torque or a reaction torque according to a steering control amount supplied from the ECU 600 to the steering shaft 420. The torque application portion 460 includes a motor which generates the assist torque or the reaction torque according to the steering control amount, and a torque transmission mechanism which transmits the torque generated by the motor to the steering shaft 420.

In the above description, "connected so as to be able to transmit torque" means that members are connected so that a rotation of one member causes a rotation of the other member. For example, at least a case where one member and the other member are integrally molded, a case where one member is directly or indirectly fixed to the other member, and a case where one member and the other member are connected so as to be interlocked with each other via a joint member or the like are included.

Further, in the example described above, a steering device in which the steering member 410 to the rack shaft 480 are always mechanically connected is taken as an example, but the present embodiment is not limited to this. For example, a steering device according to the present embodiment may be, for example, a steering device of a steer-by-wire type. The matters described below in this specification can also be applied to the steering device of the steer-by-wire type.

The ECU 600 collectively controls various electronic devices included in the vehicle 900. For example, the ECU 600 controls a magnitude of the assist torque or reaction torque applied to the steering shaft 420 by adjusting the steering control amount supplied to the torque application portion 460.

Further, the ECU 600 controls an opening and closing of a solenoid valve by supplying a suspension control amount to the solenoid valve included in the hydraulic shock absorber included in the suspension apparatus 100. In order to enable this control, an electric power line for supplying drive power from the ECU 600 to the solenoid valve is arranged.

Also, the vehicle 900 includes a vehicle wheel speed sensor 320 which is installed for each vehicle wheel 300 and detects a vehicle wheel speed of each vehicle wheel 300, a lateral G sensor 330 which detects a lateral acceleration of the vehicle 900, a front-rear G sensor 340 which detects a front-rear acceleration of the vehicle 900, a yaw rate sensor 350 which detects a yaw rate of the vehicle 900, an engine torque sensor 510 which detects a torque generated by the engine 500, an engine speed sensor 520 which detects a speed of the engine 500, and a brake pressure sensor 530 which detects a pressure applied to a brake fluid of a brake device. Detection results of these various sensors are supplied to the ECU 600.

Although not illustrated, the vehicle 900 includes an antilock brake system (ABS) which is a system to prevent a vehicle wheel lock during braking, a traction control system (TCS) which suppresses slipping of the vehicle wheel during acceleration, or the like, and a vehicle stability assist (VSA) controllable braking device which is a vehicle behavior stabilization control system equipped with an automatic braking function for a yaw moment control or a brake assist function during turning.

Here, the ABS, the TCS, and the VSA compare a vehicle wheel speed determined according to an estimated vehicle body speed with the vehicle wheel speed detected by the vehicle wheel speed sensor 320, and then the ABS, the TCS, and the VSA determine that the vehicle is in a slip state when the values of these two vehicle wheel speeds differ by a predetermined value or more. Through such processing, the ABS, the TCS, and the VSA aim to stabilize a behavior of the vehicle 900 by performing an optimum brake control or traction control according to a traveling state of the vehicle 900.

Further, the supply of the detection results by the various sensors described above to the ECU 600 and the transmission of the control signal from the ECU 600 to each part are performed via a controller area network (CAN) 370.

[Suspension Control Portion]

Hereinafter, the ECU 600 will be specifically described by changing the reference drawing. The ECU 600 includes a suspension control portion 650. The ECU 600 is one aspect of the suspension control device of the present embodiment.

The suspension control portion 650 refers to the detection results of various sensors included in the CAN 370, and determines a magnitude of the suspension control amount supplied to a solenoid valve included in the hydraulic shock absorber included in the suspension apparatus 100. A process of "determining the magnitude of the control amount" includes a case where the magnitude of the control amount is set to zero, that is, the control amount is not supplied.

Figure 2:
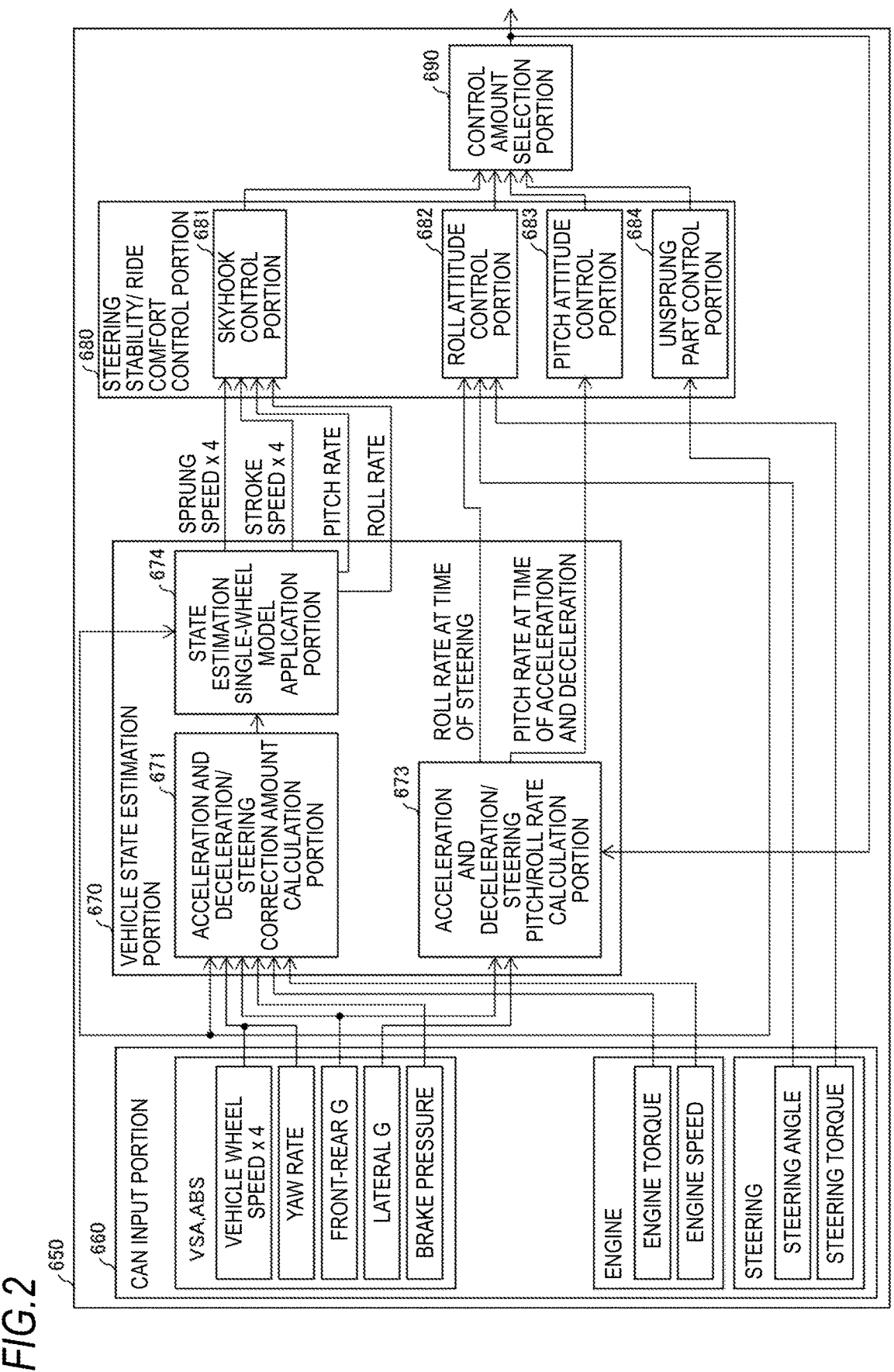
FIG. 2 is a block diagram illustrating an example of a functional configuration of a suspension control portion according to the first embodiment of the present invention.

Next, the suspension control portion 650 will be described more specifically with reference to FIG. 2. FIG. 2 is a block diagram illustrating an example of a functional configuration of the suspension control portion 650.

As illustrated in FIG. 2, the suspension control portion 650 includes a CAN input portion 660, a vehicle state estimation portion 670, a steering stability/ride comfort control portion 680, and a control amount selection portion 690.

The CAN input portion 660 acquires various signals via the CAN 370. For example, as illustrated in FIG. 2, the CAN input portion 660 acquires the following signals (parentheses indicate an acquisition source).

Vehicle wheel speeds of four wheels (vehicle wheel speed sensor 320A to 320D)
Yaw rate (yaw rate sensor 350)
Front-rear G (front-rear G sensor 340)
Lateral G (lateral G sensor 330)
Brake pressure (brake pressure sensor 530)
Engine torque (engine torque sensor 510)
Engine speed (engine speed sensor 520)
Steering angle (steering angle sensor 440)
Steering torque (torque sensor 430)

The vehicle state estimation portion 670 estimates a state of the vehicle 900 with reference to various signals acquired by the CAN input portion 660. The vehicle state estimation portion 670 outputs sprung speeds of the four wheels, stroke speeds of the four wheels, a pitch rate, a roll rate, a roll rate at the time of steering, and a pitch rate at the time of acceleration/deceleration as the estimation results.

As illustrated in FIG. 2, the vehicle state estimation portion 670 includes an acceleration and deceleration/steering correction amount calculation portion 671, an acceleration and deceleration/steering pitch/roll rate calculation portion 673, and a state estimation single-wheel model application portion 674.

The acceleration and deceleration/steering correction amount calculation portion 671 calculates a vehicle body front-rear speed, an inner and outer wheel difference ratio, and an adjustment gain with reference to the yaw rate, the front-rear G, the vehicle wheel speeds of the four wheels, the brake pressure, the engine torque, and the engine speed, and then the acceleration and deceleration/steering correction amount calculation portion 671 supplies the calculation results to the state estimation single-wheel model application portion 674.

The acceleration and deceleration/steering pitch/roll rate calculation portion 673 calculates the roll rate at the time of steering and the pitch rate at the time of acceleration/deceleration with reference to the front-rear G and the lateral G. The calculation results are supplied to the steering stability/ride comfort control portion 680.

The acceleration and deceleration/steering pitch/roll rate calculation portion 673 may be configured to further refer to the suspension control amount output by the control amount selection portion 690. Further, the roll rate value may be configured to take "0" as a reference value when an inclination of the vehicle 900 does not change for a predetermined minute time, and may represent a roll rate as a deviation from the reference value. Further, the acceleration and deceleration/steering pitch/roll rate calculation portion 673 may provide a dead zone of about ±0.5 in the roll rate at the time of steering. Here, the sign is, for example, "+" on a left side of the vehicle 900 and "−" on a right side.

The state estimation single-wheel model application portion 674 applies a one-wheel model for state estimation to each wheel with reference to the calculation results by the acceleration and deceleration/steering correction amount calculation portion 671, and calculates the sprung speeds of the four wheels, the stroke speeds of the four wheels, the pitch rate, and the roll rate. The calculation results are supplied to the steering stability/ride comfort control portion 680.

The steering stability/ride comfort control portion 680 includes a skyhook control portion 681, a roll attitude control portion 682, a pitch attitude control portion 683, and an unsprung part control portion 684.

The skyhook control portion 681 performs a ride comfort control (vibration suppression control) which suppresses a shaking of the vehicle when riding over unevenness of a road surface and enhances ride comfort. As an example, the skyhook control portion 681 determines a skyhook target control amount with reference to the sprung speeds of the four wheels, the stroke speeds of the four wheels, the pitch rate, and the roll rate, and supplies the result to the control amount selection portion 690.

As a more specific example, the skyhook control portion 681 sets a damping force base value by referring to a sprung-damping force map based on the sprung speed. Further, the skyhook control portion 681 calculates a skyhook target damping force by multiplying the set damping force base value by a skyhook gain. Then, the skyhook target control amount is determined based on the skyhook target damping force and the stroke speed.

The roll attitude control portion 682 controls a roll attitude by calculating a roll attitude target control amount with reference to the roll rate at the time of steering, a steering angle signal indicating the steering angle, and a steering torque signal indicating the steering torque. The calculated roll attitude target control amount is supplied to the control amount selection portion 690. A specific configuration of the roll attitude control portion 682 will be described below.

The pitch attitude control portion 683 controls a pitch with reference to the pitch rate at the time of acceleration and deceleration, determines the pitch target control amount, and supplies the result to the control amount selection portion 690.

The unsprung part control portion 684 controls the unsprung vibration suppression of the vehicle 900 with reference to the vehicle wheel speeds of the four wheels, and determines an unsprung vibration suppression control target control amount. The determination result is supplied to the control amount selection portion 690.

The control amount selection portion 690 selects a target control amount having the highest value among the skyhook target control amount, the roll attitude target control amount, the pitch target control amount, and the unsprung vibration suppression control target control amount, and outputs the selected target control amount as the suspension control amount.

[Roll Attitude Control Portion]

Figure 3:
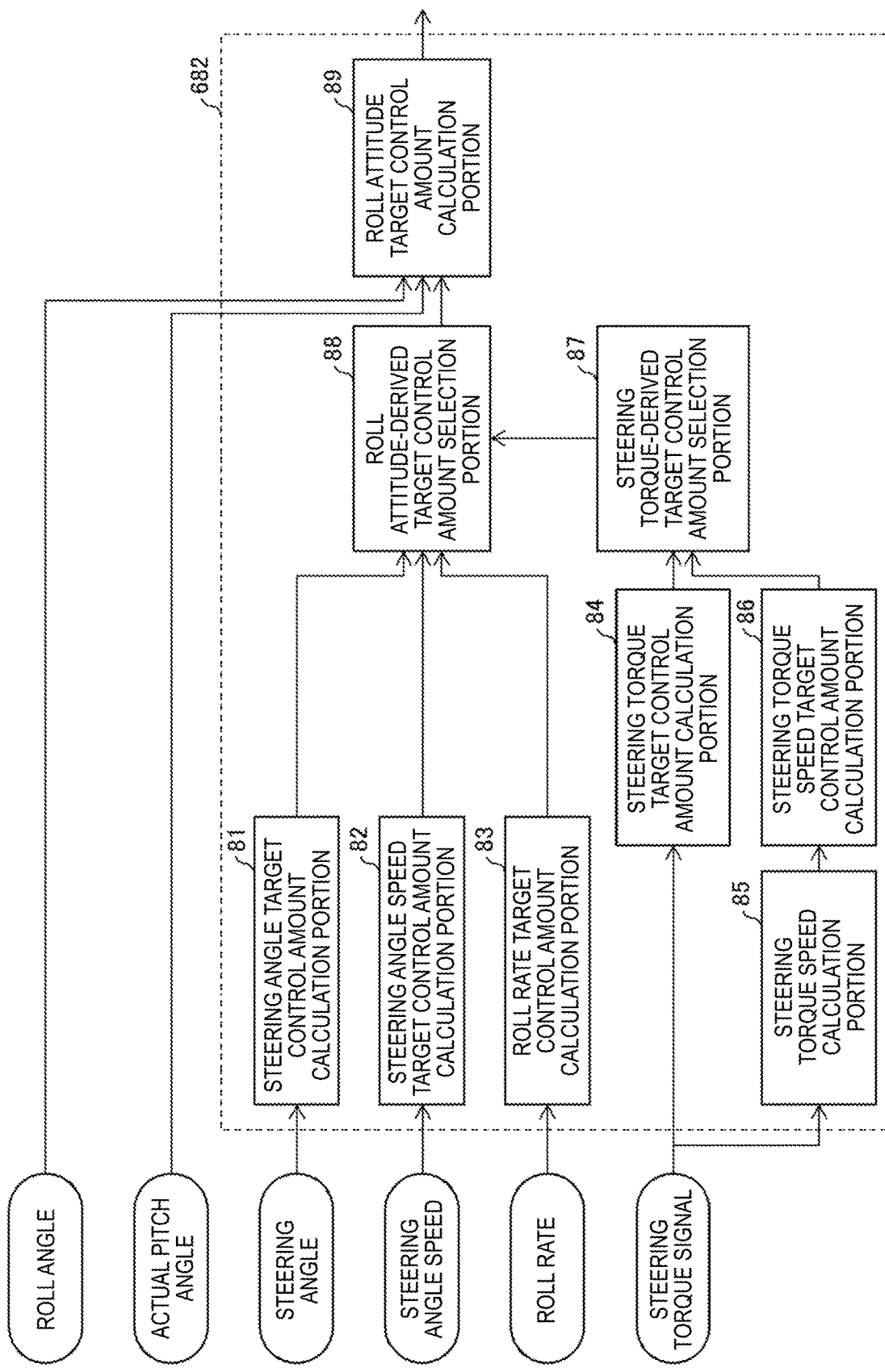
FIG. 3 is a block diagram illustrating an example of a functional configuration of a roll attitude control portion according to the first embodiment of the present invention.

In the following, the roll attitude control portion 682 will be described more specifically with reference to FIG. 3. FIG. 3 is a block diagram illustrating an example of a functional configuration of the roll attitude control portion 682 according to the present embodiment. The roll attitude control portion 682 calculates the roll attitude target control amount with reference to a roll angle signal, an actual pitch angle signal, the steering angle signal, a steering angle speed signal, a roll rate signal, and the steering torque signal.

Here, as the roll angle signal referred to by the roll attitude control portion 682, for example, the vehicle 900 may be configured to include a roll angle sensor, and the output from the roll angle sensor may be used as the roll angle signal, but the present invention is not limited to this. For example, the roll rate calculated by the vehicle state estimation portion 670 may be configured to be integrated by the vehicle state estimation portion 670, and the roll angle obtained by the integration may be configured to be used as the roll angle signal.

Further, as the actual pitch angle signal referred to by the roll attitude control portion 682, for example, the vehicle 900 may be configured to include a pitch angle sensor, and the output from the pitch angle sensor may be configured to be used as the pitch angle signal, but the present invention is not limited to this. For example, the pitch rate calculated by the vehicle state estimation portion 670 may be configured to be integrated by the vehicle state estimation portion 670, and the pitch angle obtained by the integration may be configured to be used as the actual pitch angle signal.

Further, as the steering angle speed signal referred to by the roll attitude control portion 682, the steering angle signal output by the CAN input portion 660 may be configured to be differentiated by, for example, steering stability/ride comfort control portion 680, and the steering angle speed obtained by the differentiation may be configured to be used as the steering angle speed signal.

Here, the roll attitude target control amount can be a target control amount that is a candidate for the suspension control amount, in other words, a target control amount that is referred to when controlling the damping force of the suspension. For example, the roll attitude target control amount calculated by the roll attitude control portion 682 can be a suspension control amount when selected by the control amount selection portion 690. Therefore, it can be expressed that the roll attitude control portion 682 calculates the suspension control amount.

As illustrated in FIG. 3, the roll attitude control portion 682 includes a steering angle target control amount calculation portion 81, a steering angle speed target control amount calculation portion 82, a roll rate target control amount calculation portion 83, a steering torque target control amount calculation portion 84, a steering torque speed calculation portion 85, a steering torque speed target control amount calculation portion 86, a steering torque-derived target control amount selection portion 87, a roll attitude-derived target control amount selection portion 88, and a roll attitude target control amount calculation portion 89.

The steering angle target control amount calculation portion 81 calculates a steering angle target control amount with reference to the steering angle indicated by the steering angle signal. The steering angle speed target control amount calculation portion 82 calculates a steering angle speed target control amount with reference to the steering angle speed signal. Both the steering angle target control amount calculation portion 81 and the steering angle speed target control amount calculation portion 82 refer to the steering angle signal to suppress roll of the vehicle 900 and calculate the target control amount so that attitude of the vehicle 900 becomes closer to flat.

The roll rate target control amount calculation portion 83 calculates a roll rate target control amount with reference to the roll rate at the time of steering supplied from the acceleration and deceleration/steering pitch/roll rate calculation portion 673.

The steering torque target control amount arithmetic portion 84 calculates a steering torque target control amount with reference to the steering torque signal indicated by the steering torque signal. The steering torque speed calculation portion 85 calculates a steering torque speed by referring to a time change of the steering torque indicated by the steering torque signal. The steering torque speed target control amount calculation portion 86 calculates a steering torque speed target control amount with reference to the steering torque speed calculated by the steering torque speed calculation portion 85 for each of the four wheels of the vehicle 900.

In this way, both the steering torque target control amount arithmetic portion 84 and the steering torque speed target control amount calculation portion 86 directly or indirectly refer to the steering torque signal to calculate the target control amount so that the roll of the vehicle 900 is suppressed and the attitude of the vehicle 900 becomes closer to flat.

The steering torque-derived target control amount selection portion 87 selects a target control amount having a higher value among the steering torque target control amount and the steering torque speed target control amount as a steering torque-derived target control amount.

The roll attitude-derived target control amount selection portion 88 selects a target control amount having a higher value among the steering angle target control amount, the steering angle speed target control amount, the roll rate target control amount, and the steering torque-derived target control amount as a roll attitude-derived target control amount. In the present embodiment, of a calculation of a control amount of the suspension, a control until the roll attitude-derived target control amount selection portion 88 selects a roll attitude-derived target control amount is also referred to as a "steering torque response control".

(Roll Attitude Target Control Amount Calculation Portion)

Figure 4:
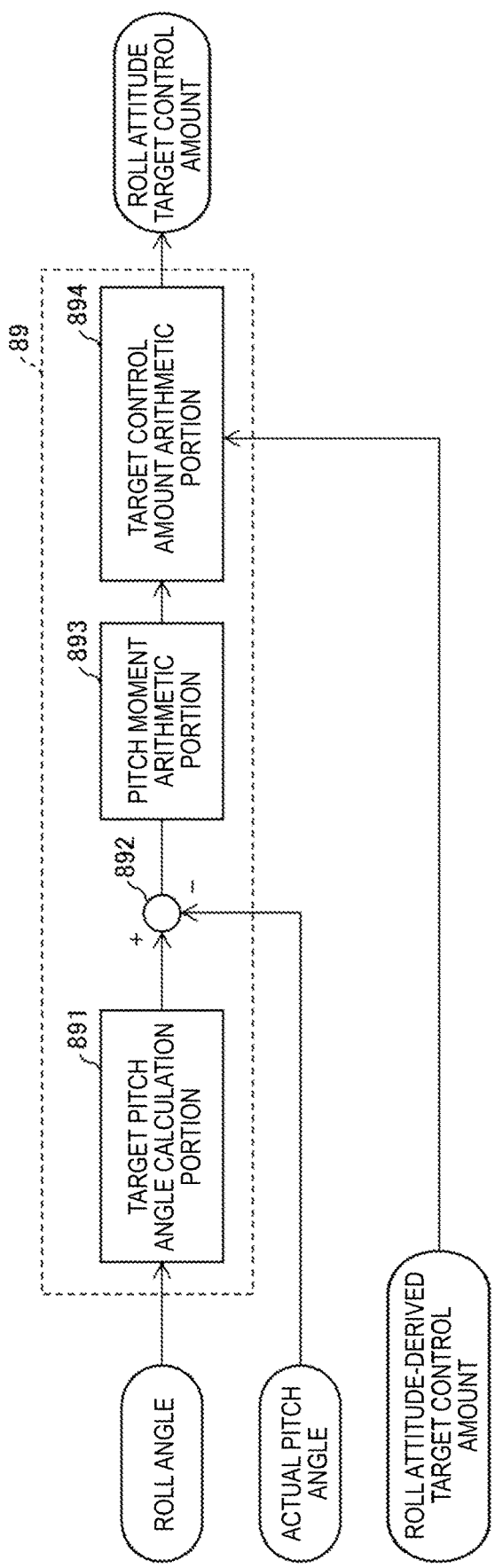
FIG. 4 is a block diagram illustrating an example of a functional configuration of a roll attitude target control amount according to the first embodiment of the present invention.

FIG. 4 is a block diagram illustrating an example of a functional configuration of the roll attitude target control amount calculation portion 89 according to the present embodiment. As illustrated in FIG. 4, the roll attitude target control amount calculation portion 89 includes a target pitch angle calculation portion 891, a subtraction portion 892, a pitch moment arithmetic portion 893, and a target control amount arithmetic portion 894.

Figure 5:
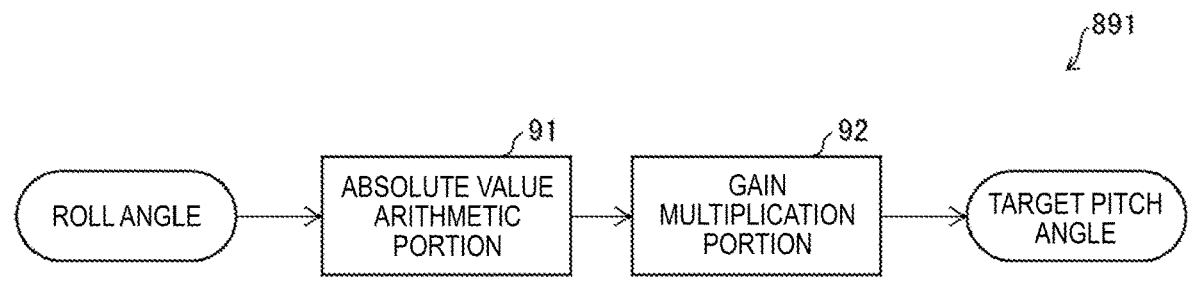
FIG. 5 is a block diagram illustrating an example of a functional configuration of a target pitch angle calculation portion according to the first embodiment of the present invention.

The target pitch angle calculation portion 891 calculates a target pitch angle with reference to the roll angle signal. FIG. 5 is a block diagram illustrating an example of a functional configuration of the target pitch angle calculation portion 891 according to the present embodiment. For example, the target pitch angle calculation portion 891 includes an absolute value arithmetic portion 91 and a gain multiplication portion 92, as illustrated in FIG. 5. The absolute value arithmetic portion 91 calculates an absolute value of the roll angle indicated by the roll angle signal and supplies the calculated absolute value to the gain multiplication portion 92. The gain multiplication portion 92 calculates the target pitch angle by multiplying the absolute value of the roll angle supplied from the absolute value arithmetic portion 91 by a gain.

As illustrated in FIG. 4, the roll attitude target control amount calculation portion 89 calculates the target control amount with further reference to an actual pitch angle. More specifically, the roll attitude target control amount calculation portion 89 calculates the target control amount according to a difference between the target pitch angle and the actual pitch angle.

The subtraction portion 892 calculates the difference obtained by subtracting the actual pitch angle from the target pitch angle calculated by the target pitch angle calculation portion 891.

The pitch moment arithmetic portion 893 calculates a pitch moment of the vehicle 900 according to the difference in pitch angle calculated by subtraction portion 892. By calculating the pitch moment of the vehicle 900 according to the difference in pitch angle, it is possible to calculate a more suitable pitch moment from a viewpoint of an attitude control as compared with a case where the pitch moment is calculated without referring to the actual pitch angle.

The target control amount arithmetic portion 894 calculates the target control amount with reference to the pitch moment calculated by the pitch moment arithmetic portion 893 and the roll attitude-derived target control amount selected by the roll attitude-derived target control amount selection portion 88. The target control amount obtained by this calculation is the roll attitude target control amount described above, and is an output value of the roll attitude control portion 682 described above.

Here, when the roll attitude-derived target control amount is the steering torque-derived target control amount, for example, the target control amount arithmetic portion 894 receives the steering torque-derived target control amount as the roll attitude-derived target control amount, and adds the pitch moment to the received steering torque-derived target control amount to calculate the roll attitude target control amount.

As described above, the steering torque-derived target control amount is a control amount obtained with reference to the steering torque signal. Further, the roll attitude target control amount is a target control amount referred to when controlling the damping force of the suspension. In this way, the target control amount arithmetic portion 894 calculates the target control amount with reference to the steering torque signal and the target pitch angle. For example, the target control amount arithmetic portion 894 can calculate the roll attitude target control amount with reference to the steering torque-derived target control amount obtained with reference to the steering torque signal and the target pitch angle.

In the present embodiment, a control in which the roll attitude-derived target control amount is the steering torque-derived target control amount and the roll attitude target control amount is calculated with reference to the roll attitude-derived target control amount and the pitch moment is also referred to as a "steering torque reference control".

Here, a suspension control according to the present embodiment will be described more specifically from steering by the driver.

First, when a driver turns the steering member 410, the steering torque is generated and the steering torque signal is generated by the turning operation of the steering member 410 by the driver. The vehicle wheel 300A and the vehicle wheel 300B are steered so as to have a steering angle according to the generated steering torque signal, and the vehicle 900 turns according to the steering angle.

When the vehicle 900 is turning, a damping force is generated according to a displacement speed of absorbers (front wheel side absorber and rear wheel side absorber) due to a roll motion, and a force which pushes down an axle is generated according to a difference between the damping force on the extension side and the damping force on the contraction side. In addition, the pitch moment is generated due to a difference in damping force between the front and rear wheels. Therefore, when the vehicle 900 is turning, a motion in which the roll motion and a pitch motion are combined is generated in the vehicle 900. As described above, a motion of the vehicle 900 is detected as various state quantities by the various sensors described above. The detection result is input to the CAN input portion 660 as described above, and is used for controlling the operation of the suspension apparatus 100 described above.

In the present embodiment, it is possible to carry out control for further improving the turning feeling with reference to the roll angle and the pitch angle. For example, the suspension is controlled so that a time difference between a peak of the roll angle and a peak of the pitch angle in the vehicle 900 is smaller. This control allows the driver of the vehicle 900 to feel a favorable turning feeling.

More specifically, the target control amount arithmetic portion 894 refers to the roll angle of the vehicle 900 and the pitch moment calculated by the pitch moment arithmetic portion 893. Then, the target control amount arithmetic portion 894 calculates the roll attitude target control amount which makes a difference between a phase of the roll angle in the vehicle 900 and a phase of the pitch angle obtained from the pitch moment.

Here, in the calculation of the roll attitude target control amount according to the target control amount arithmetic portion 894, the difference between the phase of the roll angle and the phase of the pitch angle can be appropriately set within a range sufficiently small for the driver to get the favorable turning feeling. From the viewpoint that the driver gets the favorable turning feeling, the smaller the difference, the more preferable, for example, it is preferably ¼ cycle or less, more preferably ⅛ cycle or less, and most preferably zero. The "cycle" may be a roll angle cycle or a pitch angle cycle, but from the above viewpoint, the "cycle" is preferably a smaller cycle of the roll angle cycle and the pitch angle cycle.

Figure 6:
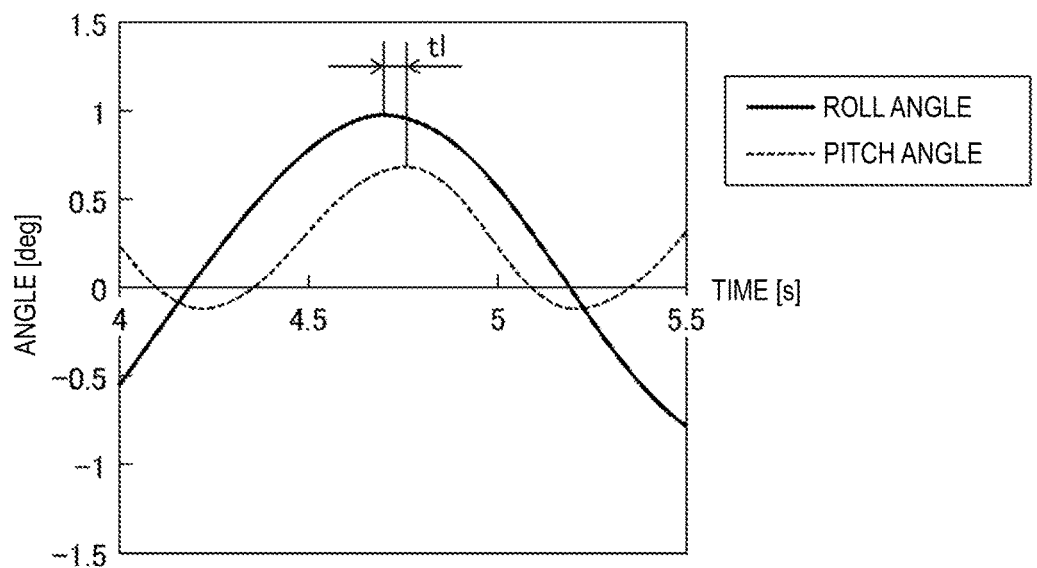
FIG. 6 is a diagram illustrating an example in which a time difference between peaks of a roll angle and a pitch angle of the vehicle is small.

FIG. 6 is a diagram illustrating an example in which the time difference between the peaks of the roll angle and the pitch angle of the vehicle 900 is small. With a phase difference illustrated in FIG. 6, the driver of the vehicle 900 can generally obtain the favorable turning feeling. The time difference between the peaks is the time difference between the peak of the roll angle and the peak of the pitch angle closest to each other on a time axis. The time difference is called the phase difference, and it is said that the roll angle and the pitch angle are synchronized when the time difference is zero.

The target control amount arithmetic portion 894 calculates the roll attitude target control amount which sufficiently makes the difference between the phase of the roll angle and the phase of the pitch angle smaller. Then, with reference to the calculated roll attitude target control amount, the roll attitude target control amount is calculated based on the roll attitude-derived target control amount selected by the roll attitude-derived target control amount selection portion 88. For example, the target control amount arithmetic portion 894 calculates the roll attitude target control amount by adding the above-described roll attitude target control amount to the roll attitude-derived target control amount selected by the roll attitude-derived target control amount selection portion 88. The above-described control which makes the difference between the phase of the roll angle and the phase of the pitch angle based on the above-described pitch moment smaller is also referred to as a "phase difference reference control".

Figure 7:
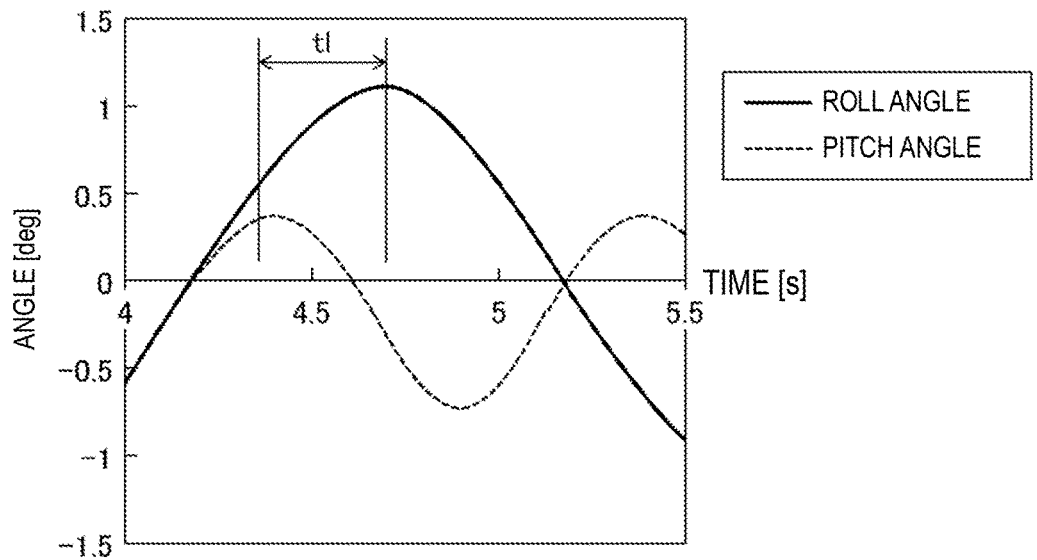
FIG. 7 is a diagram illustrating an example in which the time difference between the peaks of the roll angle and the pitch angle of the vehicle is large.

When the time difference between the peaks of the roll angle and the pitch angle of the vehicle 900 is large, the driver of the vehicle 900 generally cannot obtain the favorable turning feeling. FIG. 7 is a diagram illustrating an example in which the time difference between the peaks of the roll angle and the pitch angle of the vehicle 900 is large. With the phase difference illustrated in FIG. 7, the driver of the vehicle 900 may feel some discomfort between, for example, the steering performed by him or herself and the turning feeling obtained thereby. Even when the roll attitude target control amount calculated based on the difference between the phase of the roll angle and the phase of the pitch angle is added to the roll attitude-derived target control amount selected by the roll attitude-derived target control amount selection portion 88, the driver of the vehicle 900 cannot obtain the favorable turning feeling.

(Operation Effect of Steering Torque Response Control)

In the present embodiment, the steering torque-derived target control amount selection portion 87 selects a target control amount having a higher value among the steering torque target control amount and the steering torque speed target control amount as the steering torque-derived target control amount. In general, there is a tendency that the signal rises earlier at the torque speed, which is a time change of the torque, than at the torque indicated by the steering torque signal. Similarly, there is a tendency that the signal rises earlier at the steering angle speed, which is a time change of the steering angle, than at the steering angle indicated by the steering angle signal. Then, the roll attitude-derived target control amount selection portion 88 selects a target control amount having a higher value among the steering angle target control amount, the steering angle speed target control amount, the roll rate target control amount, and the steering torque-derived target control amount as the roll attitude-derived target control amount. Therefore, according to the present embodiment, it is possible to perform a more appropriate suspension control that responds swiftly to changes in steering conditions.

Further, since the roll attitude control portion 682 calculates the roll attitude-derived target control amount, which is a candidate for the suspension control amount, with reference to the steering torque signal and the steering angle signal, the damping force of the suspension can be appropriately controlled according to the steering condition.

Further, the roll attitude control portion 682 can calculate the steering torque-derived target control amount so that the damping force of the suspension on a side opposite to a steering direction is large. In this case, it is possible to realize a favorable ride comfort according to the steering condition and the stability of the vehicle 900.

(Operation Effect of Phase Difference Reference Control)

When the vehicle 900 is turning, the motion in which the roll motion and the pitch motion are combined is generated in the vehicle 900. In this case, gain characteristics of the pitch angle with respect to the roll angle can be set by appropriately setting the difference in damping force between the left and right and the front and rear. Further, by appropriately setting the roll rate and the absorber displacement speed, the phase difference of the pitch angle with respect to the roll angle can be set. Further, by optimally setting or controlling the phase of these motions, the driver's turning feeling can be improved, and as a result, the behavior of the vehicle 900 by the driver can be easily recognized. The turning feeling is a sense of change in the behavior of the vehicle with the five senses of the driver.

According to the present embodiment, the damping characteristics of the front wheel side absorber and the rear wheel side absorber are set so that a phase difference between the roll angle cycle and the pitch angle cycle is smaller. As a result, a phase of the combined motion of the roll motion and the pitch motion in the vehicle 900 is optimized, and it becomes possible to realize the vehicle behavior with a sense of unity between the roll motion and the pitch motion in the transient motion. Therefore, the driving burden on the driver can be reduced.

(Operation Effect of Steering Torque Reference Control)

As described above, when the driver steers the vehicle 900 with the steering member 410, the steering torque is generated at the start of steering, and the steering torque signal is generated. The roll attitude target control amount calculation portion 89 refers to the generated steering torque signal as the steering torque-derived target control amount. The target control amount arithmetic portion 894 calculates the roll attitude target control amount with reference to the roll attitude-derived target control amount selected by the roll attitude-derived target control amount selection portion 88 described above and the pitch moment.

According to the present embodiment, the roll attitude target control amount, which is a target control amount for enhancing the driver's turning feeling, is prepared when the steering torque signal is detected. Therefore, in the present embodiment, the roll attitude target control amount is prepared and used for the suspension control before the driver actually starts steering with the steering member 410 and the vehicle 900 makes a turning motion. Then, as a steering amount of the steering member 410 increases, a control effect of the suspension by the roll attitude target control amount becomes stronger.

The roll attitude target control amount increases from a time when the steering torque is generated. As described above, in the present embodiment, the suspension is controlled so as to enhance the driver's turning feeling from the start of turning the steering members 410. Therefore, the driver's turning feeling is enhanced from the beginning of the steering operation of the steering member 410, and the sense of unity with the vehicle 900 that the driver feels is further enhanced.

In a case of controlling to enhance the driver's turning feeling according to the state of the vehicle 900, as in a case where the occurrence of the roll motion of the vehicle 900 caused by the vehicle 900 starting the turning motion is detected, after a predetermined time elapses from the start of the steering operation of the steering member 410 by the driver, the suspension control by the roll attitude target control amount substantially works. Therefore, in the case of controlling to enhance the driver's turning feeling according to the state of the vehicle 900, the improvement of the driver's turning feeling is enhanced after the turning motion of the steering member 410 starts to be substantially reflected in the behavior of the vehicle 900. A suspension control that enhances the turning feeling is not reflected in a period between the turning motion and the improvement of the turning feeling, and during this period, the sense of unity with the vehicle 900 that the driver feels cannot be enhanced.

As is clear from the above description, it can be said that the present embodiment is a mode in which the roll attitude target control amount is always calculated and another target control amount derived from the steering torque is always added.

Generally, after inputting the steering torque, a yaw motion is generated in the vehicle, and then the roll motion and the pitch motion are generated. In the present embodiment, the roll attitude target control amount is calculated using the steering torque calculated by the driver's steering, which is faster than a roll-related value or a pitch-related value representing the vehicle behavior. Therefore, compared to a case where the roll attitude is controlled according to the roll-related value or the pitch-related value representing the vehicle behavior, more quickly, specifically, almost at the same time that the steering torque input begins to be reflected in the vehicle behavior, it is possible to reflect the control that enhances the driver's turning feeling. As described above, in the present embodiment, it is possible to synchronize the roll and pitch of the vehicle by controlling the suspension, and it is possible to enhance the sense of unity with the vehicle 900 that the driver feels.

Second Embodiment

Another embodiment of the present invention will be described below. For convenience of explanation, the same reference numerals are given to the members having the same functions as the members described in the above-described embodiment, and the description thereof will not be repeated.

Figure 8:
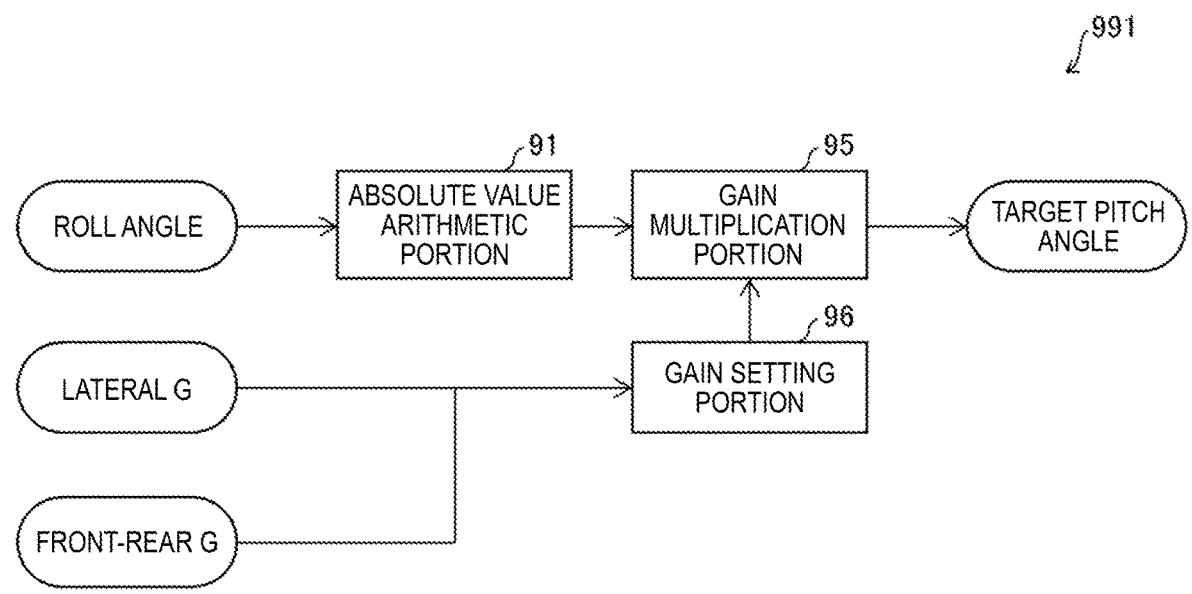
FIG. 8 is a block diagram illustrating an example of a functional configuration of a target pitch angle calculation portion according to a second embodiment of the present invention.

The present embodiment is different from the first embodiment in that a target pitch angle calculation portion 991 is provided instead of the target pitch angle calculation portion 891. FIG. 8 is a block diagram illustrating an example of a functional configuration of the target pitch angle calculation portion 991 according to the present embodiment. The target pitch angle calculation portion 991 includes a gain multiplication portion 95 instead of the gain multiplication portion 92. The target pitch angle calculation portion 991 further includes a gain setting portion 96. In these respects, the target pitch angle calculation portion 991 is different from the target pitch angle calculation portion 891 in the first embodiment. The gain multiplication portion 92 and the gain setting portion 96 form a gain change portion.

The gain setting portion 96 sets a gain value with reference to a lateral G signal indicating the lateral acceleration of the vehicle 900 and a front-rear G signal indicating the front-rear acceleration of the vehicle 900. The gain multiplication portion 95 refers to the gain value set by the gain setting portion 96, and changes the gain to be multiplied according to the gain value. Then, the gain multiplication portion 95 calculates the target pitch angle by multiplying the absolute value of the roll angle calculated by the absolute value arithmetic portion 91 by the changed gain.

When the road surface has the unevenness, the unevenness causes the lateral G and front-rear G of the vehicle 900 to fluctuate directly or indirectly via steering torque or the like. Therefore, it is advantageous to refer to the lateral G and the front-rear G of the vehicle 900 for calculating the target pitch angle from a viewpoint of performing a suspension control that appropriately reflects a road surface condition.

Third Embodiment

Still another embodiment of the present invention will be described below. For convenience of explanation, the same reference numerals are given to the members having the same functions as the members described in the above-described embodiment, and the description thereof will not be repeated.

Figure 9:
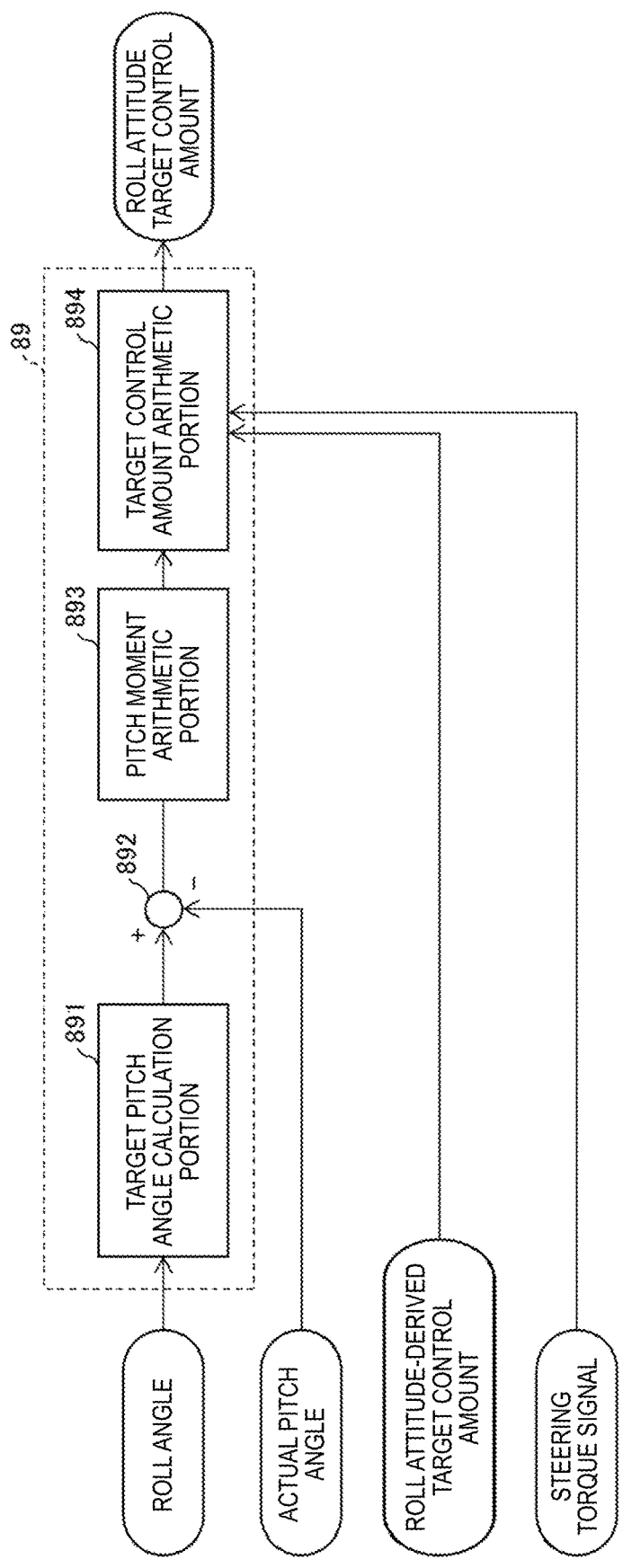
FIG. 9 is a block diagram illustrating an example of a functional configuration of a roll attitude target control amount according to a third embodiment of the present invention.

The present embodiment is the same as the above-described first embodiment except that the roll attitude control portion 682 does not include the steering torque target control amount arithmetic portion 84, the steering torque speed calculation portion 85, the steering torque speed target control amount calculation portion 86, and the steering torque-derived target control amount selection portion 87 and the target control amount arithmetic portion 894 in the roll attitude target control amount calculation portion 89 is configured to refer to the steering torque signal. FIG. 9 is a block diagram illustrating an example of a functional configuration of the roll attitude target control amount calculation portion 89 according to the third embodiment of the present invention.

The target control amount arithmetic portion 894 refers to the roll attitude-derived target control amount and the pitch moment, and also refers to the steering torque signal. For example, the target control amount arithmetic portion 894 calculates a first target control amount with reference to the roll attitude-derived target control amount and the pitch moment. Then, the target control amount arithmetic portion 894 refers to the steering torque signal and calculates a second target control amount by correcting the first target control amount. Then, the target control amount arithmetic portion 894 outputs the calculated second target control amount as the roll attitude target control amount.

The correction of the target control value with reference to the steering torque signal is performed, for example, as follows. The target control amount arithmetic portion 894 sets the gain value with reference to the steering torque signal. For example, when a value (for example, a displacement amount per unit time) of the steering torque signal is large, the gain value is also increased accordingly. The target control amount arithmetic portion 894 changes the gain to be multiplied according to the gain value, and multiplies the changed gain by the first target control amount to calculate the second target control amount. The gain may be multiplied by the roll attitude-derived target control amount before the first target control amount is calculated, may be multiplied by the pitch moment, or may be multiplied by both the roll attitude-derived target control amount and the pitch moment.

Alternatively, in the present embodiment, a threshold value of the steering torque signal may be set. For example, when the steering torque signal exceeds the threshold value, the target control amount arithmetic portion 894 may perform a process of adding the pitch moment to the roll attitude-derived target control amount, or may perform a process of multiplying the gain according to the steering torque signal.

According to the present embodiment, it is possible to execute the steering torque reference control according to the steering operation by the driver. For example, it is possible to execute the steering torque reference control more strongly than a stronger steering operation. Therefore, it is even more effective from a viewpoint of providing the driver with the sense of unity with the vehicle 900 that matches the driver's turning feeling.

In the present embodiment, in addition to the reference to the steering torque signal, other state quantities of the vehicle 900 may be further referred to. For example, in the present embodiment, in addition to the steering torque signal, the lateral G signal and the front-rear G signal of the vehicle 900 may be further referred to. The lateral G signal and the front-rear G signal may be referred to in the calculation of the first target control amount or the second target control amount in the same manner as in the second embodiment described above. By further referring to such other state quantities, an effect of the above-described second embodiment can be further expressed in addition to the above-described effect of the present embodiment.

[Example of Implementation by Software]

A control block (for example, roll attitude target control amount calculation portion 89) of the vehicle 900 may be realized by a logic circuit (hardware) formed in an integrated circuit (IC chip) or the like, or may be realized by software.

In the latter case, the vehicle 900 is equipped with a computer which executes instructions of a program that is software that realizes each function. The computer includes, for example, one or more processors and a computer-readable recording medium that stores the program. Then, in the computer, the processor reads the program from the recording medium and executes the program, thereby achieving the object of the present invention.

As the processor, for example, a central processing unit (CPU) can be used. As the recording medium, a "non-temporary tangible medium", for example, a read only memory (ROM) or the like, a tape, a disk, a card, a semiconductor memory, a programmable logic circuit, or the like can be used. A random access memory (RAM) or the like for loading the program may be further provided.

Further, the program described above may be supplied to the computer via any transmission medium (communication network, broadcast wave, and the like) capable of transmitting the program. An aspect of the present invention can also be realized in a form of a data signal embedded in a carrier wave, in which the above-described program is embodied by electronic transmission.

Additional Notes

The present invention is not limited to the above-described embodiments, and various modifications can be made within the scope of the claims. Also, the technical scope of the present invention includes embodiments obtained by appropriately combining the technical means disclosed in the different embodiments.

For example, in the embodiment described above, the threshold value of the steering torque signal may be set when referring to the steering torque signal. For example, the steering torque signal generated by any amount of movement larger than the play set in the steering member 410 may be used as the threshold value. According to this configuration, since the control of the present embodiment is performed when the driver substantially steers the steering member 410, it is possible to suppress the occurrence of excessive control in the present embodiment.

Further, in the embodiment described above, the ECU 600 may be configured to select a specific target control amount as the roll attitude-derived target control amount according to a type of the state quantities of the vehicle 900 to be acquired. For example, when the ECU 600 receives the steering torque signal, the roll attitude-derived target control amount selection portion 88 may be configured to select the steering torque-derived target control amount as the roll attitude-derived target control amount with reference to the steering torque signal.

As an example, in general, depending on the road surface condition, a more favorable ride comfort may be realized by outputting the target control amount derived from the steering angle signal without outputting the target control amount derived from the steering torque signal. By adopting a configuration in which a specific target control amount is selected as the roll attitude-derived target control amount according to the type of the state quantities of the vehicle 900 to be acquired, a more suitable target control amount can be output according to the driver's intention according to the road surface condition. Therefore, according to this configuration, a more favorable ride comfort can be realized.

In the embodiment described above, the control which enhances the turning feeling is not limited to the control which makes the difference between the phase of the roll angle and the phase of the pitch angle smaller. For example, it is known that the driver's turning feeling is enhanced by appropriately controlling a relationship between the roll angle and the pitch angle in addition to the phase difference. In the embodiment described above, the roll attitude target control amount may be calculated so as to have such a relationship between the roll angle and the pitch angle.

For example, it is known that the driver's turning feeling is improved by setting an amount of front-rear inclination of the vehicle during rolling to front lowering regardless of a turning acceleration. The relationship between the roll angle and the pitch angle in this case is expressed by the following equation. In the equation, $\theta$ is the pitch angle and $\phi$ is the roll angle. In the following equation, the pitch angle of the front lowering is positive.

$$\theta \geq 0 (\text{where}, \phi \neq 0)$$

Further, it is known that the turning feeling is improved when there is always no phase difference between the roll angle and the pitch angle of the vehicle during rolling. In this case, the roll angle and the pitch angle are considered to be in a proportional relationship and are expressed by the following equation. In the equation, $k_{rp}$ is a constant of proportionality.

$$\theta = k_{rp} \phi$$

Further, it is known that when a ratio of a roll angular velocity and a pitch angular velocity is constant, the turning feeling is improved. In this case, the ratio of the roll angular velocity and the pitch angular velocity is expressed by the following equation. In the equation, $\theta$ dot represents the pitch angular velocity and $\phi$ dot represents the roll angular velocity.

$$\frac{\dot{\theta}}{\dot{\phi}} = const.$$

Further, in the embodiment described above, the roll attitude target control amount calculation portion 89 may calculate the roll attitude target control amount with reference to the target pitch angle calculated by the target pitch angle calculation portion 891 and the roll angle without referring to the actual pitch angle. According to this configuration, it is possible to further reduce a control load for calculating the roll attitude target control amount.

In the embodiment described above, the state quantity of the vehicle 900 may be a measured value (actual measurement value) by various sensors or an estimated value.

Further, in the embodiment described above, other controls for enhancing the driver's turning feeling may be performed in parallel as long as the effect of the present embodiment can be obtained. For example, to optimize the phase of the combined motion of the roll motion and the pitch motion, control that the difference between the damping force on the extension side and the damping force on the contraction side in the front wheel side absorbers is set to be larger than the difference between the damping force on the extension side and the damping force on the contraction side in the rear wheel side absorbers when the roll occurs on the vehicle 900 may be further added in the suspension control described above.

Further, in the second embodiment described above, one or both of the lateral G and the front-rear G may be used as the gain change portion. Further, the gain value may be set based on a state quantity other than the lateral G and the front-rear G.

Alternatively, in the second embodiment described above, a specific control according to the state of the vehicle 900 may be performed in parallel as long as the effect of the present embodiment can be obtained. For example, in a motion region where comfort regarding the roll during steering is important, for example, in a motion region where lateral acceleration is 0.2 G (G represents gravitational acceleration) or within a predetermined range including 0.2 G, damping coefficients of the front wheel side absorber and the rear wheel side absorber with respect to a suspension stroke speed may be linearly increased from the contraction side to the extension side. Alternatively, the linear increase may be approximated to a stepwise increase to increase the damping coefficient in the motion region.

SUMMARY

The suspension control device according to the embodiment of the present invention controls the damping force of the suspension. The suspension control device includes the target pitch angle calculation portion (891) which calculates the target pitch angle with reference to the roll angle signal, and the target control amount calculation portion (for example, target control amount arithmetic portion 894) which calculates the roll attitude target control amount referred to when controlling the damping force of the suspension with reference to the steering torque signal and the target pitch angle. According to this configuration, it is possible to perform a suspension control that can synchronize the roll and pitch of the vehicle. Therefore, according to the configuration described above, it is possible to enhance the sense of unity with the vehicle that the driver feels.

The target control amount calculation portion may calculate the roll attitude target control amount with reference to the steering torque-derived target control amount obtained with reference to the steering torque signal and the target pitch angle. According to this configuration, the reference of the steering torque signal when calculating the steering torque-derived target control amount, which is the roll attitude-derived target control amount, can be applied instead of the reference of the steering torque signal when calculating the roll attitude target control amount. As a result, duplication of processing related to reference to the steering torque signal is prevented. Therefore, this configuration is even more effective from a viewpoint of performing the suspension control that responds swiftly to changes in steering conditions.

The target control amount calculation portion may calculate the target control amount with further reference to the actual pitch angle. According to this configuration, it is possible to calculate the roll attitude target control amount according to a pitch angle of the target pitch angle that does not overlap with the actual pitch angle. Therefore, the configuration described above is more effective from a viewpoint of improving the accuracy of controlling the damping force of the suspension for enhancing the driver's turning feeling. In addition, the target control amount calculation portion may calculate the target control amount according to the difference between the target pitch angle and the actual pitch angle. This configuration is even more effective from the above point of view.

The target pitch angle calculation portion may include the gain multiplication portion which calculates the target pitch angle by multiplying the roll angle signal by the gain. According to this configuration, the target pitch angle can be easily calculated by using the relationship between the roll angle and the pitch angle, which is more effective from a viewpoint of suppressing an increase in the control load.

The target pitch angle calculation portion may include a first gain change portion which changes a value of the gain with reference to the lateral acceleration. In addition, the target pitch angle calculation portion may include a second gain change portion which changes a value of the gain with reference to the front-rear acceleration. These configurations are even more effective in controlling the suspension from a viewpoint of appropriately reflecting the road surface condition.

The suspension device according to the embodiment of the present invention includes the suspension (suspension apparatus 100) and the control portion (ECU 600) which controls the damping force of the suspension. Also, the control portion includes the target pitch angle calculation portion which calculates the target pitch angle with reference to the roll angle signal, and the target control amount calculation portion which calculates the target control amount referred to when controlling the damping force of the suspension with reference to the steering torque signal and the target pitch angle. According to this configuration, it is possible to perform the suspension control that can synchronize the roll and pitch of the vehicle, and thus it is possible to enhance the sense of unity with the vehicle that the driver feels.

What is claimed is:

1. A suspension control device configured to control a damping force of a suspension, comprising:
   a target pitch angle calculation portion configured to calculate a target pitch angle with reference to a roll angle signal; and
   a target control amount calculation portion configured to calculate a target control amount by adding a steering torque-derived target control amount and a pitch moment, the target control amount being referred to when controlling the damping force of the suspension, the steering torque-derived target control amount being obtained with reference to a steering torque signal, and the pitch moment being calculated according to a difference between the target pitch angle and an actual pitch angle, wherein
   the target pitch angle calculation portion includes a gain multiplication portion configured to calculate the target pitch angle by multiplying the roll angle signal by a gain, and
   the target pitch angle calculation portion includes a first gain change portion configured to change a value of the gain with reference to a lateral acceleration.

2. The suspension control device according to claim 1, wherein
   the target control amount calculation portion is configured to calculate the target control amount with further reference to the actual pitch angle.

3. The suspension control device according to claim 2, wherein the target control amount calculation portion is configured to calculate the target control amount according to the difference between the target pitch angle and the actual pitch angle.

4. The suspension control device according to claim 1, wherein the target pitch angle calculation portion includes a second gain change portion configured to change a value of the gain with reference to a front-rear acceleration.

5. The suspension control device according to claim 2, wherein the target pitch angle calculation portion includes a second gain change portion configured to change a value of the gain with reference to a front-rear acceleration.

6. The suspension control device according to claim 3, wherein the target pitch angle calculation portion includes a second gain change portion configured to change a value of the gain with reference to a front-rear acceleration.

7. A suspension device comprising:
a suspension; and
a control portion configured to control a damping force of the suspension, wherein
the control portion includes,
a target pitch angle calculation portion configured to calculate a target pitch angle with reference to a roll angle signal, and
a target control amount calculation portion configured to calculate a target control amount by adding a steering torque-derived target control amount and a pitch moment, the target control amount being referred to when controlling the damping force of the suspension, the steering torque-derived target control amount being obtained with reference to a steering torque signal, and the pitch moment being calculated according to a difference between the target pitch angle and an actual pitch angle,
the target pitch angle calculation portion includes a gain multiplication portion configured to calculate the target pitch angle by multiplying the roll angle signal by a gain, and
the target pitch angle calculation portion includes a first gain change portion configured to change a value of the gain with reference to a lateral acceleration.

* * * * *